US008316240B2

(12) United States Patent
Graziani (10) Patent No.: US 8,316,240 B2
(45) Date of Patent: Nov. 20, 2012

(54) SECURING COMPUTER LOG FILES

(75) Inventor: Valerio Graziani, Rome (IT)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/390,383

(22) Filed: Feb. 20, 2009

(65) Prior Publication Data

US 2010/0218002 A1 Aug. 26, 2010

(51) Int. Cl.
*H04L 29/06* (2006.01)
(52) U.S. Cl. ........................................ 713/189
(58) Field of Classification Search .................. 713/189
See application file for complete search history.

(56) References Cited

U.S. PATENT DOCUMENTS

| | | | | |
|---|---|---|---|---|
| 2003/0236992 | A1* | 12/2003 | Yami | 713/200 |
| 2007/0288768 | A1* | 12/2007 | Nesta et al. | 713/194 |
| 2008/0064501 | A1* | 3/2008 | Patel | 463/40 |
| 2010/0115284 | A1* | 5/2010 | Hahn et al. | 713/179 |

OTHER PUBLICATIONS

Boneh et al., "Authenticating Digital Streams," http://crypto.stanford.edu/~nagendra/projects/StreamAuth/, Nov. 13, 1999.
Accorsi, R., "Towards a Secure Logging Mechanism for Dynamic Systems," Proceedings of the 7th IT Security Symposium. Sao Jose dos Campos, Brazil, Nov. 2005.
Schneier et al., "Cryptographic Support for Secure Logs on Untrusted Machines," The Seventh USENIX Security Symposium Proceedings, USENIX Press, Jan. 1998, pp. 53-62.
Haber et al., "How to Time-Stamp a Digital Document," Journal of Cryptology, Jan. 1991, pp. 99-111, vol. 3, No. 2.
Schneier et al., "Automatic Event-Stream Notarization Using Digital Signatures," Security Protocols, International Workshop Apr. 1996 Proceedings, Springer-Verlag, pp. 155-169.
"The Keyed-Hash Message Authentication Code (HMAC)", FIPS PUB 198, Federal Information Processing Standards Publication, Mar. 6, 2002, pp. i-13.
Demaine, Erik D. et al., Introductions to Algorithms, Lecture 7: Hashing I, Oct. 3, 2005, located at http://www.core.org.cn/NR/rdonlyres/Electrical-Engineering-and-Computer-Science/6-046JFall-2005/11608C3D-CF70-4D0A-8153-E836FDB9515A/0/lec7.pdf, which is a PowerPoint excerpt from the book by the same authors, entitled, "Introduction to Algorithms", Sep. 1, 2001, 1184 pp., 2nd edition, MIT Press, located at http://www.amazon.com/Introduction-Algorithms-Thomas-H-Cormen/dp/0262032937.
Herb, Horst. GNotary Digital Notary Service—Development branch, Jul. 6, 2001, pp. 1-2, http://freshmeat.net/projects/gnotary.
Heileman, Gregory L. et al., "How Caching Affects Hashing", Proceedings of the Seventh Workshop on Algorithm Engineering and Experiments, Jan. 2005, pp. 141-154.
Churches, Tim, "Tamper-evident logs", Oct. 23, 2008, p. 1, http://mail.python.org/pipermail/python-list/2002-October/169268.html.
Google Search Results for "tamper evident logs", Google searched on Jan. 19, 2012, 2 pages.
"Hash chain", Wikipedia, http://en.wikipedia.org/wiki/Hash_chain, accessed on Jan. 19, 2012, 2 pages.

* cited by examiner

*Primary Examiner* — Jason Gee
(74) *Attorney, Agent, or Firm* — Stephen J. Walder, Jr.; Jeffrey S. LaBaw (57) ABSTRACT

A log file is secured. One implementation involves maintaining a log file including one or more log entries in a storage device connected to a computer, and entering a new log entry by generating a new message authentication code based on a preceding log entry including a preceding message authentication code, and applying the message authentication code to the new log entry.

18 Claims, 6 Drawing Sheets

SECURING COMPUTER LOG FILES

BACKGROUND

The invention relates generally to computer data, and in particular, to securing computer log files.

In information technology (IT) environments comprising computing and networking systems, log files are normally secured using Access Control Lists (ACLs) for restricting access to them. Though ACLs attempt to make it more difficult for attackers to tamper with log files and cover their tracks, ACLs cannot guarantee against such tampering. Tampering with the log files includes removal of items, modifications or both. Further, though the number of individuals who can manipulate the log files may be reduced as much as possible, access to highly trusted accounts by individuals such as administrators is still required. At a minimum, there always is privileged access to log files, which may lead to tampering with the log files.

BRIEF SUMMARY

A log file is secured. One embodiment involves maintaining a log file including one or more log entries in a storage device connected to a computer, and entering a new log entry by generating a new message authentication code based on a preceding log entry including a preceding message authentication code, and applying the message authentication code to the new log entry.

The message authentication code may comprise a key-hash-based message authentication code (HMAC). Generating a new message authentication code may include performing a hash of the preceding log entry to generate a new key-hash-based message authentication code (HMAC).

The securing process may further include detecting removal or modification of one or more log entries by detecting incompatible HMAC entries using an HMAC algorithm and decryption key on each log entry in sequence. The process may further include identifying a corrupt portion of the log file by identifying where HMAC entries are incorrect, and identifying where said corruption in the log file ends. Each log entry may include an HMAC and corresponding message, wherein the HMAC is based on a hash of the preceding log entry.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for securing log files in information technology (IT) systems. While the following description will be described in terms of such systems for clarity and placing the invention in context, it should be kept in mind that the teachings herein may have broad application to all types of systems, devices and applications.

In one embodiment, the invention provides a system implementing a securing process for securing/protecting a log file based on a key-hash-based message authentication code (HMAC) algorithm. HMAC is a type of message authentication code (MAC) that is calculated using a cryptographic hash function in combination with a secret key. As with any MAC, HMAC may be used to simultaneously verify both the data integrity and the authenticity of a message. Any iterative cryptographic hash function, such as MD5 or SHA-1, may be used in the calculation of an HMAC. An example MAC algorithm is termed HMAC-MD5 or HMAC-SHA-1. The cryptographic strength of the HMAC depends upon the cryptographic strength of the underlying hash function, the size and quality of the key and the size of the hash output length in bits.

In one implementation, the securing process for securing a log file according to the invention further involves the creation of a logging library such that before entering each new log entry (log line), a MAC signature is applied based on a preceding log message including a preceding hash. Because the hash is calculated on a single log file line instead of a full log file, performance improvement using HMAC may be obtained.

While tampering with a log file may still be possible, using the securing process of the invention, corruption of the log file due to removal or modification of one or more log entries results in incompatible HMAC entries that can be detected by a software tool application that is aware of the HMAC algorithm and decryption key on each log entry in sequence. This application is paired with the securing process used in the log library and verifies that the HMAC entries on each line are compliant with the value calculated on the preceding HMAC and message pair. In this way, a corrupt part of the log may be identified, in addition to identifying where the corruption in the log file ends. Since a preceding log line is always in memory, there is no way to tamper the log file on disk.

Figure 1:
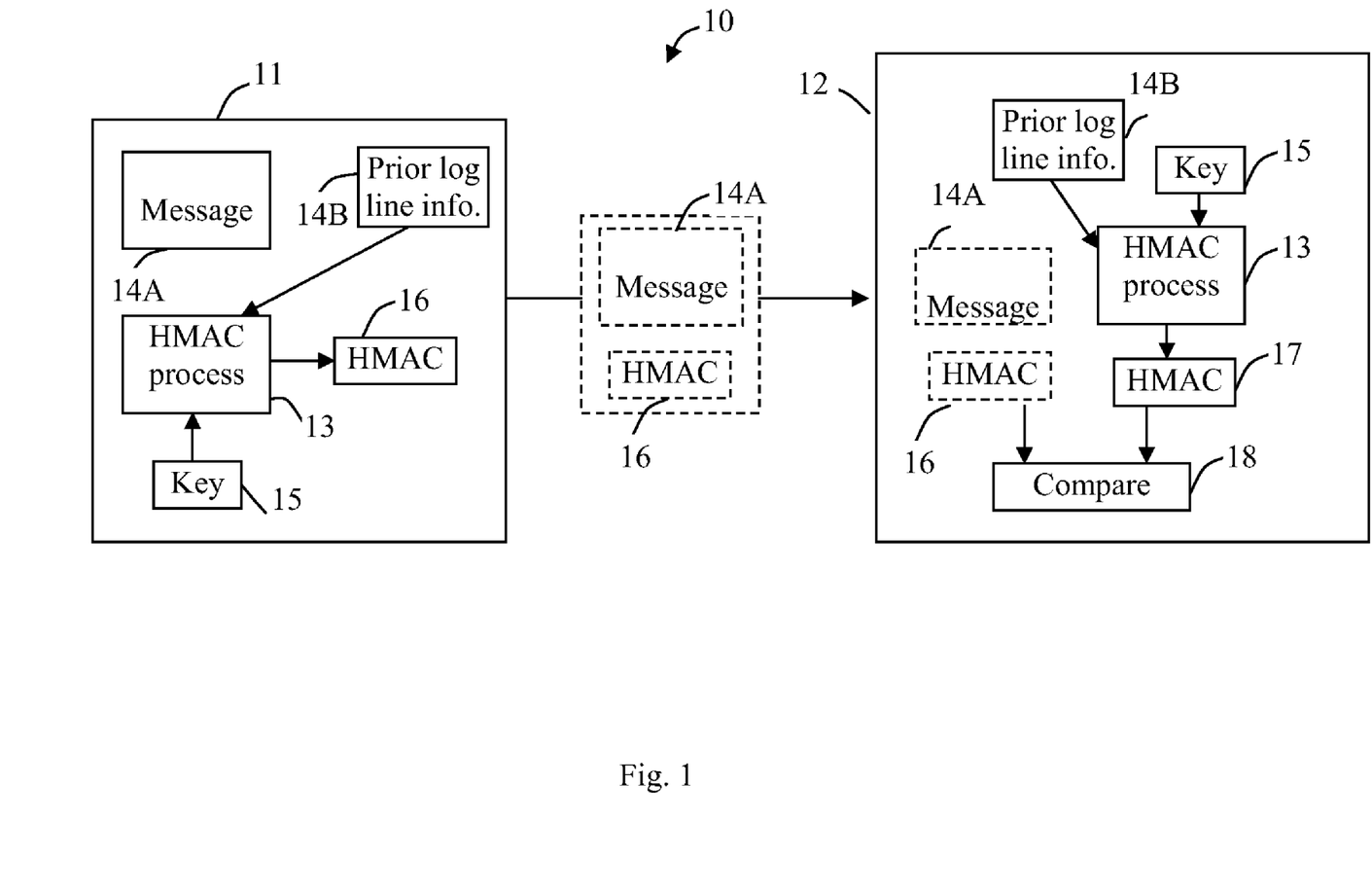
FIG. 1 shows a functional block diagram of a system for securing a log file where entering a new log entry involves generating a new message authentication code based on a preceding log entry including a preceding message authentication code, and applying the message authentication code to the new log entry.

FIG. 1 shows a functional block diagram of a system 10 implementing an embodiment of a log file securing process according to the invention. The system 10 includes a securing module 11 and a checking module 12. The securing module 11 involves an HMAC process module 13 which receives a message 14A and a key 15, and generates an HMAC 16 using information 14B (i.e., HMAC and message) of a prior log line. The message 14A and the HMAC 16 are then provided to the checking module 12. The system 10 may comprise software modules implemented on a computer system.

The checking module 12 involves an HMAC process module 13 which receives the transmitted message 14A and using a key 15 and information 14B of the prior log line generates an HMAC 17. A compare module 18 compares the generated HMAC 17 with the transmitted HMAC 16. If the HMAC 16 and the HMAC 17 match, then the message is authentic, otherwise the received message at the checking module 12 is a corrupt (or tampered with) message.

Figure 2:
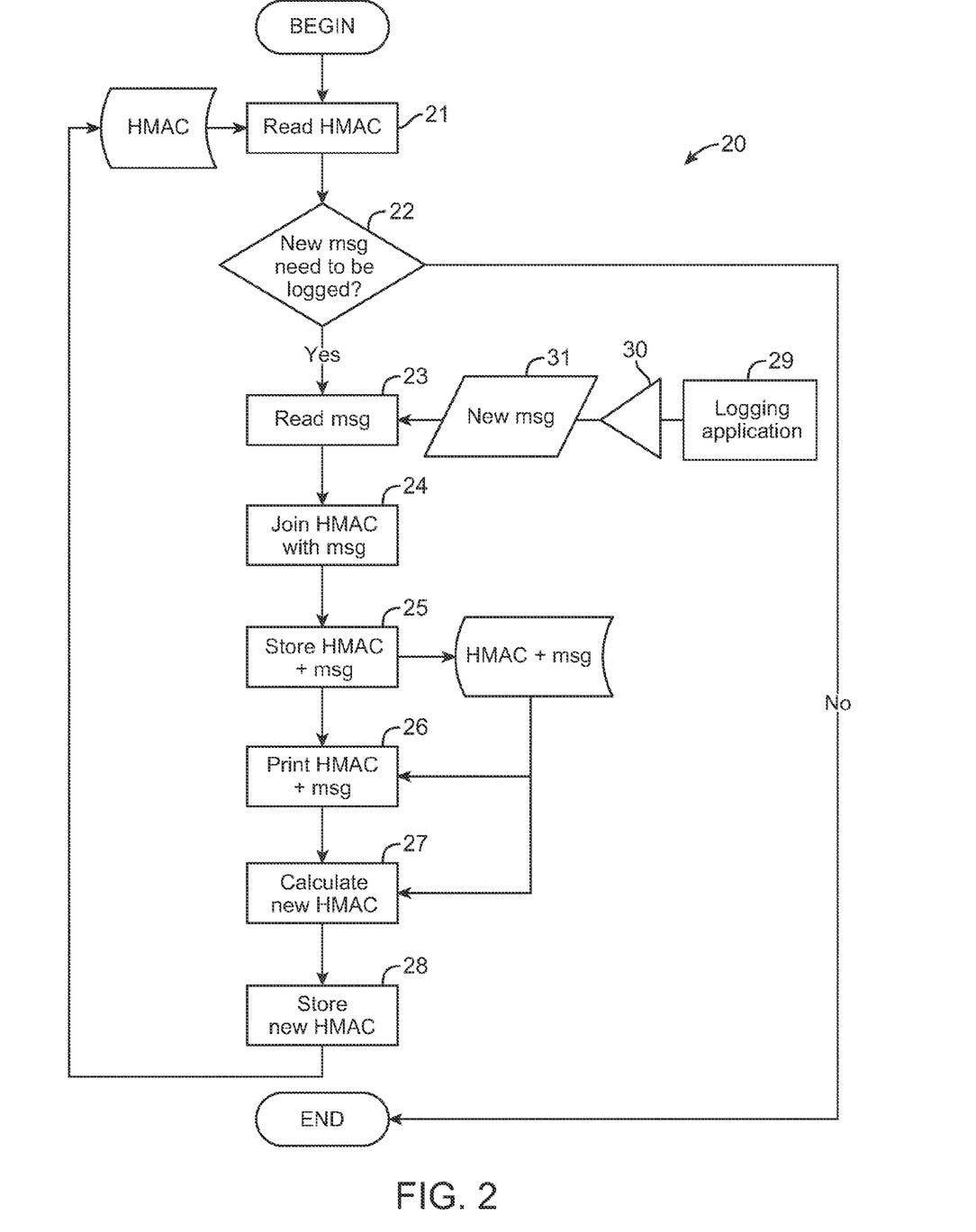
FIG. 2 shows a flowchart of a process for securing a log file.

FIG. 2 shows a flowchart of a process 20 for securing log files according to an embodiment of the invention, including:

BEGIN:
Step 21: Read HMAC.
Step 22: New message need to be logged? If yes, proceed to step 23, otherwise END.
Step 23: Read message.
Step 24: Join HMAC and message.
Step 25: Store HMAC and message.
Step 26: Print HMAC and message.
Step 27: Calculate new HMAC.
Step 28: Store new HMAC. Proceed back to step 21.
Step 29: Logging application asynchronously requires new messages to be logged
Step 30: Message queue stores incoming messages.
Step 31: New message is passed to the read message function. Proceed to step 23.

Figure 3:
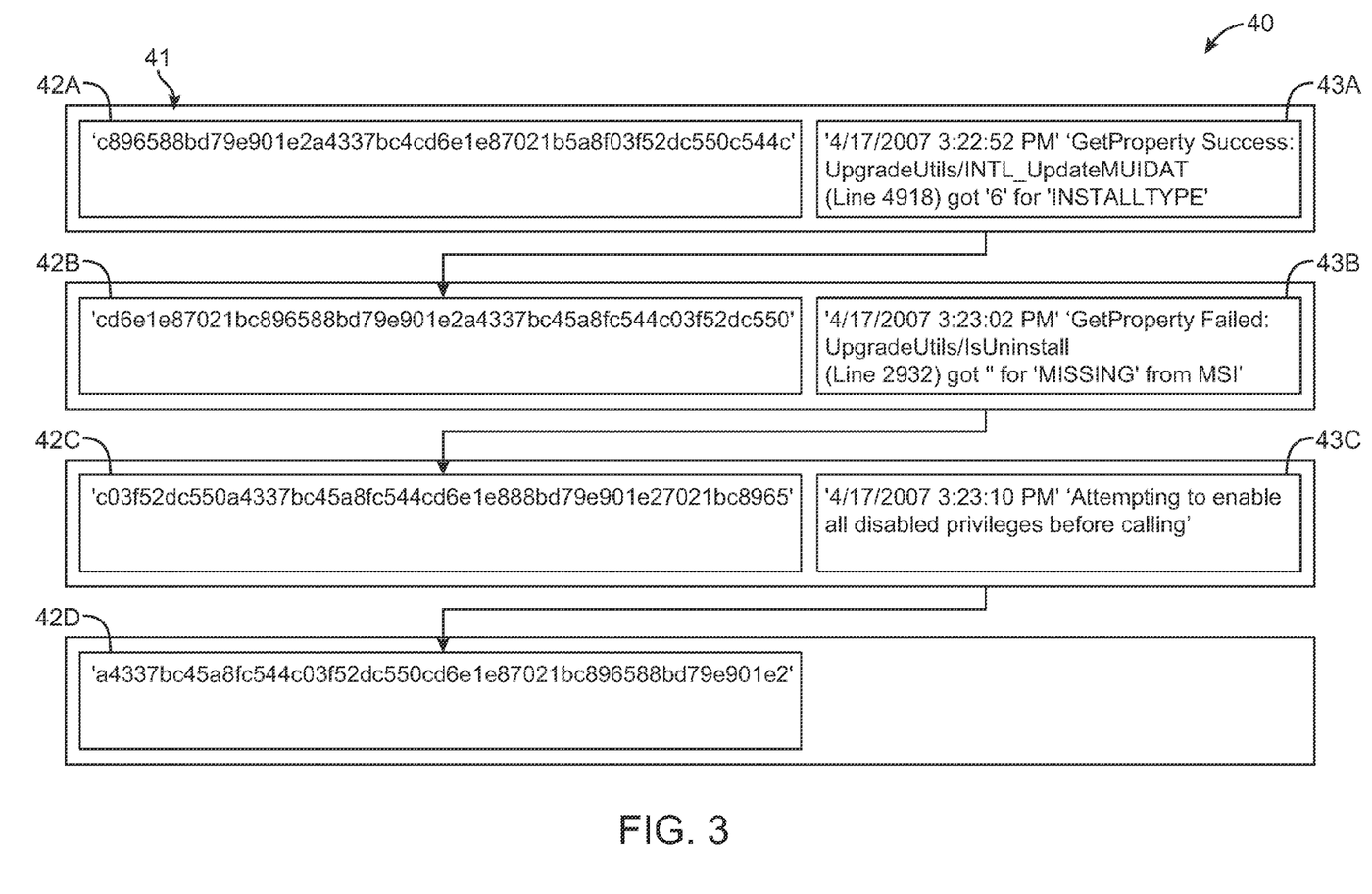
FIGS. 3 and 4 show an example of securing a log file and detecting corrupted entries.

FIG. 3 shows an example of secured logs in a log file 40, including multiple log lines (entries) 41, each line 41 including an HMAC (i.e., 42A, 42B, etc.) and a message (i.e., 43A, 43B, etc.). The log file 40 may be stored in a storage device connected to a computer. Each log line 41, including the initial hash (HMAC and message) generated in the previous iteration and a corresponding message, is hashed. As such, every HMAC from message above and corresponding message in a log line 41 is re-signed with another HMAC on the following log line. For example, HMAC 42B is hash of HMAC 42A and message 43A. HMAC 42C is a hash of HMAC 42B and message 43B. The hashing of the preceding hash (i.e., 42B) with the message (i.e., 43B) generates the following hash (i.e., 42C) and is performed during a runtime process that collects messages from an in memory buffer pool such as described in relation to FIG. 2.

Figure 4:
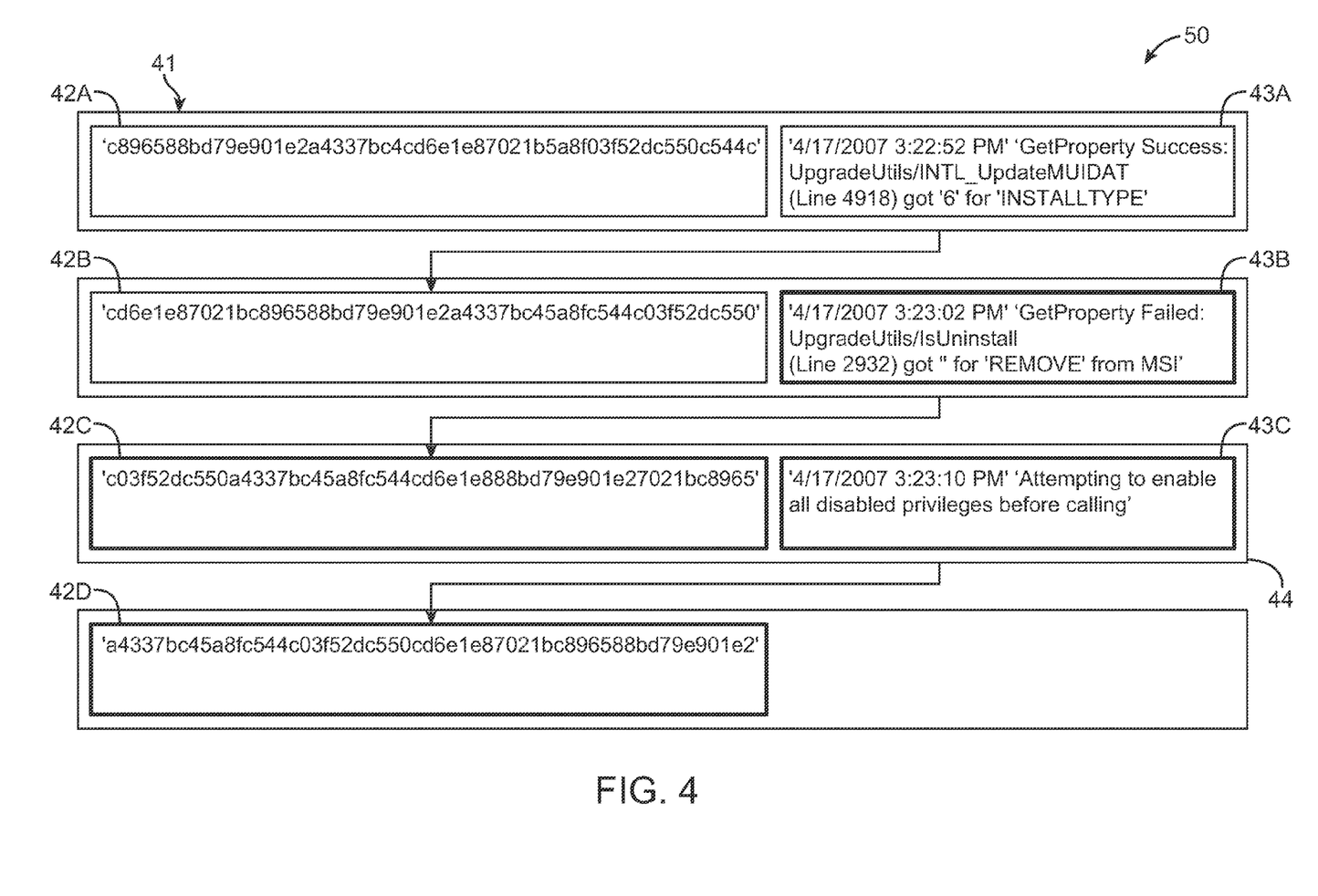

FIG. 4 shows an example of a tampered/corrupt log 50 based on log 40 in FIG. 3, including modification of one or more log lines 41. In FIG. 4, modification of the first section marked in bold rectangle (i.e., message 43B) causes all the following hashes (i.e., 42C, 42D, etc.) to become inconsistent with the correct value. When inconsistency with the correct value ends, this indicates the location where corruption in the log ends. Specifically, end of corruption can be detected when the sequence of calculated hashes and messages becomes consistent with the values visible in the log immediately after the corrupted portion (i.e., as soon as a log line is detected in which the hash is correct when verified against a hash calculated based on an immediately preceding hash and message, the detected message line is un-tampered).

Using the securing process of the invention, modification of part of a message or of an HMAC at a point in the log results in a completely inconsistent log (corrupt log) from that point onward. The removal or modification of one or more log entries results in incompatible HMAC entries that can be detected based on the HMAC algorithm and decryption key on each log entry in sequence, such as described in relation to FIG. 1. Using FIG. 3 as a base here is the result of a possible tamper on the logfile, for example, an attempt to modify part of the messages contained in the log and change the message 43B. Since the hash key is secret, the hash 42C cannot be changed to a valid value; on the other hand if only message 43B has been modified, hash 42D is the correct hash of hash 42C with message 43C in message 44. In this way, a corrupt part of the log may be identified, in addition to identifying where the corruption in the log file ends. Each hash (HMAC) can be written to the log as soon as it is calculated, and if no other messages are added in the log thereafter, the last log entry validates the hash and message above it.

An example application involves scanning (using the Hash key) a set of log files to determine if any of the log files has been tampered with. Since the logging library is always aware of the last line logged, it is not possible to intervene on the log file itself without making the modification visible. As known by those skilled in the art, traditional hash chaining involves a successive application of a cryptographic hash function to a string. The log securing process according to the invention is more secure than traditional hash-chaining since the inclusion of the preceding hash makes it possible to ensure integrity of the full log. Whereas, with traditional hash-chaining, a portion of log can still be taken out of place without notice.

Figure 5:
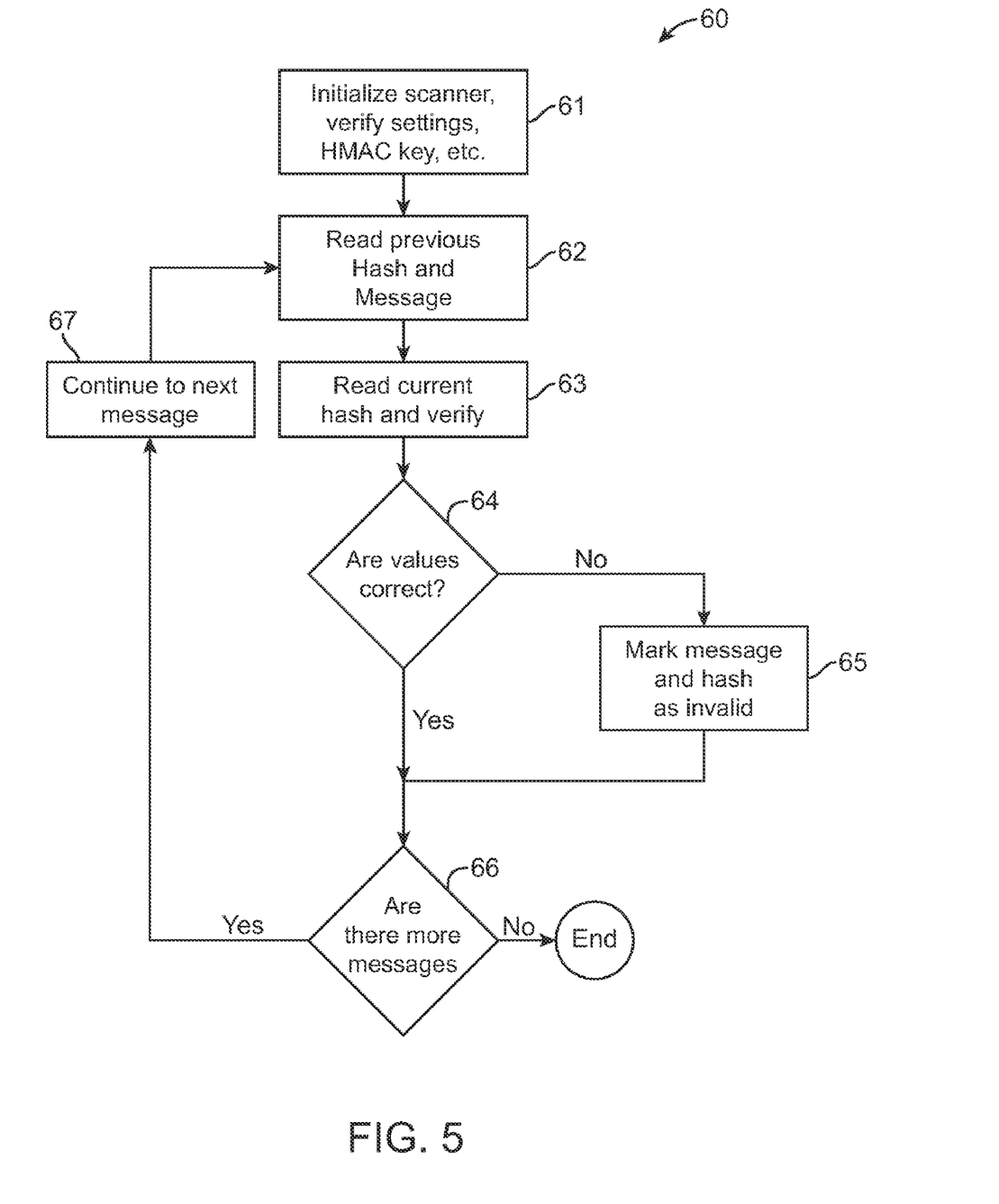
FIG. 5 shows a flowchart of process for scanning a secured log file to determine if the log file has been corrupted due to tampering.

FIG. 5 shows a flowchart of process 60 for scanning a secured of log file according to the invention to determine if the log file has been corrupted due to tampering, comprising:

Block 61: Initialize scanning, verify settings, HMAC key, etc., for the log file.
Block 62: Read previous line hash (HMAC) and message.
Block 63: Read current line hash, calculate hash of the previous line hash and message, and compare the current line hash with the calculated hash to verify sameness.
Block 64: Do the hash values verify as correct? If yes, proceed to block 66, else proceed to block 65.
Block 65: Mark previous line message and hash as invalid. Proceed to block 66.
Block 66: If there are more messages to verify, proceed to block 67, else end.
Block 67: Continue to next message in the log file.

In the above examples shown in FIGS. 3 and 4, with traditional methods removal of the items marked in bold rectangles would not be spotted. This is because using conventional techniques only the modification of a line would result in a corrupted file, not the removal of a block of messages; conventional methods do not re-hash the preceding hash with the message. As such, conventionally an attack technique may crop away a set of messages only ensuring that a valid hash and a valid message are coupled by removing message 43B and hash 42C on the following line (as such the attack will not be spotted). The same attack technique applied to the double hashing mechanism described in the invention would still be spotted since the hash following the crop 42D would not correspond to the hash 42B and message 43C that are above it; all messages following 42D would instead be all valid.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Figure 6:
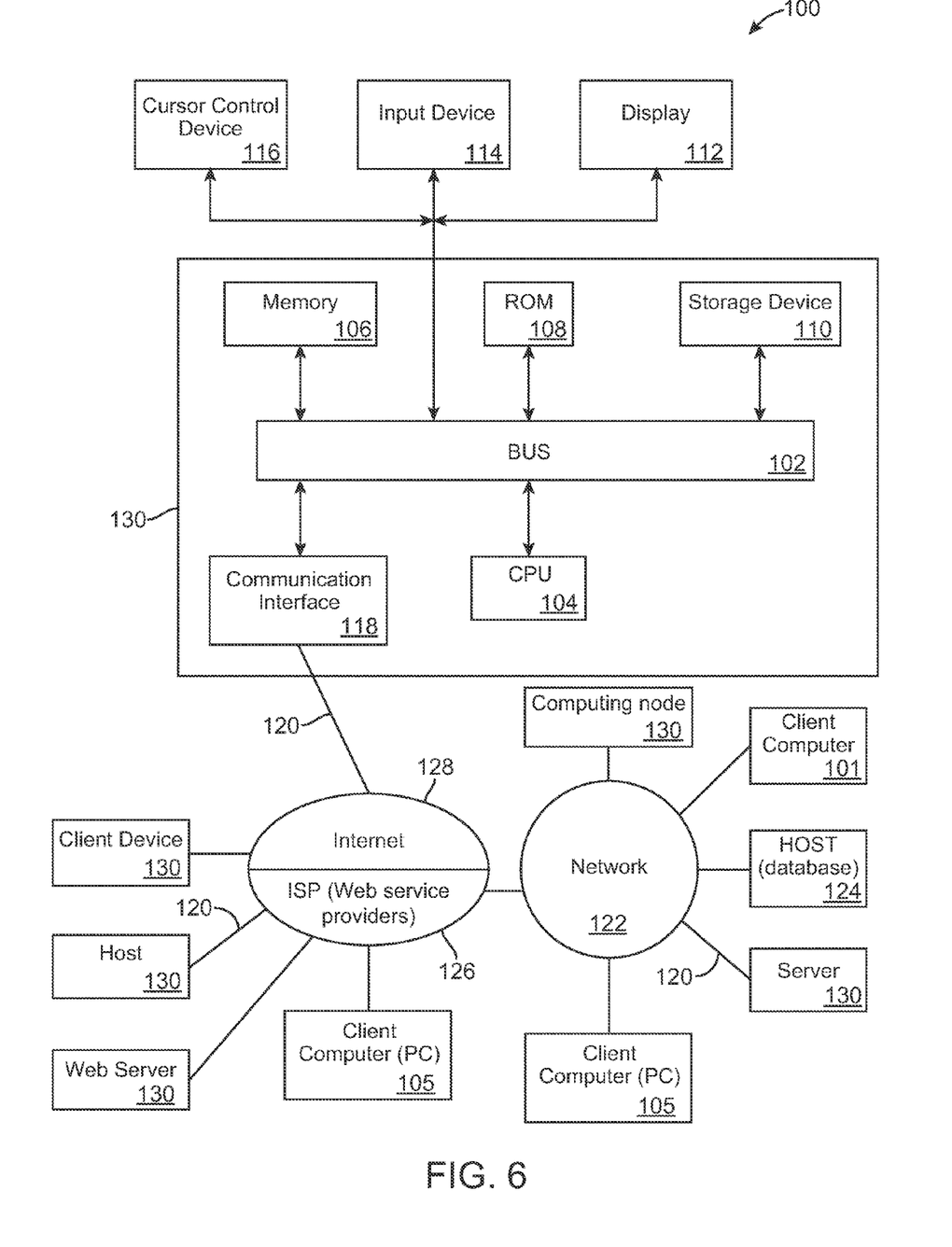
FIG. 6 shows a functional block diagram of an example information technology (IT) system in which the process for securing a log file may be implemented.

FIG. 6 shows a block diagram of an example architecture of a system 100 for implementing an embodiment of the invention. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

Generally, the term "computer-readable medium", as used herein, refers to any medium that participated in providing instructions to the processor 104 for execution. Such a medium may take many forms, including but not limited to, non-volatile media, volatile media and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104. The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and, as interconnected machine modules, within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for securing a log file, comprising:
maintaining a log file including a plurality of log entries in a storage device connected to a computer; and
entering a new log entry in the log file, wherein each log entry comprises corresponding log data and a corresponding message authentication code, the corresponding message authentication code being generated using a hash function, and wherein entering the new log entry comprises:
generating a new message authentication code by executing a hash function on a combination of log data of an immediately preceding log entry in the log file and a message authentication code of the immediately preceding log entry in the log file; and
applying the new message authentication code to the new log entry.

2. The method of claim 1 wherein each message authentication code comprises a respective key-hash-based message authentication code (HMAC).

3. The method of claim 2 further comprising:
identifying a corrupt portion of the log file by identifying where HMAC entries are incorrect.

4. The method of claim 3 wherein identifying a corrupt portion of the log file further comprises:
detecting removal or modification of one or more log entries by detecting incompatible HMAC entries using an HMAC algorithm and decryption key on each log entry in sequence.

5. The method of claim 4 further comprising:
identifying where said corruption in the log file ends.

6. The method of claim 1, wherein each message authentication code of each log entry in the plurality of log entries is a hash value generated by a hash function being applied to a combination of log data and a message authentication code of an immediately preceding log entry in the log file.

7. A system for securing a log file, comprising:
a log file including a plurality of log entries in a storage device connected to a computer; and
a securing module configured for entering a new log entry in the log file, wherein each log entry comprises corresponding log data and a corresponding message authentication code, the corresponding message authentication code bents generated using a hash function, and wherein entering the new log entry comprises:
generating a new message authentication code by executing a hash function on a combination of log data of an immediately preceding log entry in the log file and a message authentication code of the immediately preceding log entry in the log files; and
applying the new message authentication code to the new log entry.

8. The system of claim 7 further comprising:
a checking module configured for identifying a corrupt portion of the log file by identifying where hash entries are incorrect.

9. The system of claim 8 wherein the checking module is configured for identifying a corrupt portion of the log file by detecting removal or modification of one or more log entries based on incompatible hash entries using a hash algorithm and decryption key on each log entry in sequence.

10. The system of claim 9 wherein the checking module is further configured for identifying where said corruption in the log file ends by detecting when the sequence of hashes and messages becomes consistent with the values in the log file.

11. The system of claim 7, wherein each message authentication code of each log entry in the plurality of log entries is a hash value generated by a hash function being applied to a combination of log data and a message authentication code of an immediately preceding log entry in the log file.

12. A computer program product for securing a log file, said computer program product comprising:
a non-transitory computer usable medium having a computer readable program code embodied therewith, wherein the computer readable program code when executed on the computer causes the computer to:
maintain a log file including a plurality of log entries in a storage device connected to a computer; and
enter a new log entry in the log file, wherein each log entry comprises corresponding log data and a corresponding message authentication code, the corresponding message authentication code being generated using a hash function, and
wherein entering the new log entry comprises:
generating a new message authentication code by executing a hash function on a combination of log data of an immediately preceding log entry in the log file and a message authentication code of the immediately preceding log entry in the log file; and
applying the new message authentication code to the new log entry.

13. The computer program product of claim 12 wherein each message authentication code comprises a respective key-hash-based message authentication code (HMAC).

14. The computer program product of claim 13 further comprising computer readable program code for identifying a corrupt portion of the log file by identifying where HMAC entries are incorrect, and computer program product identifying where said corruption in the log file ends.

15. The computer program product of claim 14 further comprising computer readable program code for identifying a corrupt portion of the log file by detecting incompatible HMAC entries using an HMAC algorithm and decryption key on each log entry in sequence.

16. The computer program product of claim 14 wherein identifying a corrupt portion of the log file further comprises:
detecting removal or modification of one or more log entries by detecting incompatible HMAC entries using an HMAC algorithm and decryption key on each log entry in sequence.

17. The computer program product of claim 14 further comprising:
identifying where said corruption in the log file ends.

18. The computer program product of claim 12, wherein each message authentication code of each log entry in the plurality of log entries is a hash value generated by a hash function being applied to a combination of log data and a message authentication code of an immediately preceding log entry in the log file.

* * * * *